United States Patent Office 3,409,425
Patented Nov. 5, 1968

3,409,425
2-SUBSTITUTED PYRAZOLOISOINDOLONES AS HERBICIDES
Euclid W. Bousquet, Wilmington, Del., assignor to E. I. du Pont de Nemours and Company, Wilmington, Del., a corporation of Delaware
No Drawing. Continuation-in-part of application Ser. No. 435,351, Feb. 25, 1965. This application Jan. 24, 1966, Ser. No. 522,358
6 Claims. (Cl. 71—76)

This application is a continuation-in-part of my application Ser. No. 435,351, now abandoned, filed Feb. 25, 1965.

This invention relates to pyrazoloisoindolones. More particularly, it refers to 2-substituted pyrazoloisoindolones, compositions containing them and their use as plant growth regulants.

Scientific endeavor approaches the plant kingdom mindful that natural selection has not provided mankind with plants satisfactory for all of man's varied needs. It is sometimes desirable to slow the growth of plants such as lawn grasses. At the same time it is desirable to speed the germination and development of crop plants. Frequently it is desirable to slow "bud break" when spring frost threatens. At other times a speedy "bud break" is necessary to shorten the growing season.

I have discovered a group of compounds that exhibit a variety of different plant growth effects. At low rates of application such effects include growth retardation, epinasty, delayed flowering, prevention of fruit set carbohydrate enrichment and the control of auxillary bud growth. At higher rates of application compounds within the scope of this invention exhibit herbicidal action.

The compounds of my invention are described by the following formula:
(1)

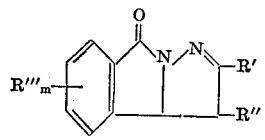

wherein

R' is tert-alkyl containing 4 through 12 carbon atoms,

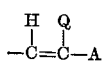

naphthyl, phenanthryl, phthalidylalkyl where the alkyl contains 1 through 3 carbon atoms or

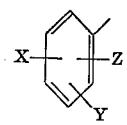

A is hydrogen, methyl, phenyl, methylphenyl or chlorophenyl;
Q is hydrogen or methyl;
X is hydrogen, halogen, alkyl containing 1 through 4 carbon atoms, alkoxy containing 1 through 4 carbon atoms, alkylthio of 1 through 4 carbon atoms, nitro, methylsulfonyl, trifluoromethyl or cyano;
Y and Z are each separately hydrogen, halogen, alkyl containing 1 through 4 carbon atoms, or alkoxy containing 1 through 4 carbon atoms;
R'' is hydrogen or alkyl of 1 through 4 carbon atoms or cyano;
R''' is hydrogen, fluorine, chlorine or bromine; and
m is a whole integer less than 5 except if R''' is fluorine, then it must be 1.

Preferred compounds because of their excellent activity as growth regulants are those of the formula:
(2)

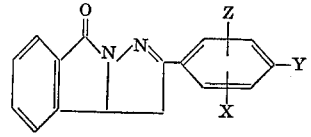

wherein
Y is hydrogen, chlorine or methoxy;
X is hydrogen, fluorine, chlorine, bromine, alkyl of 1 through 4 carbon atoms or methoxy;
Z is hydrogen or methoxy;
and when Y and Z are hydrogen, X can also be cyano or trifluoromethyl.

Particularly preferred because of their outstanding plant growth regulant activity are the following compounds:

3,3a-dihydro-2-(p-methoxyphenyl)-8H-pyrazolo[5,1-a]isoindol-8-one;
3,3a-dihydro-2-(p-chlorophenyl)-8H-pyrazolo[5,1-a]isoindol-8-one;
3,3a-dihydro-2-phenyl-8H-pyrazolo[5,1-a]isoindol-8-one.

A typical compound, 3,3a - dihydro - 2 - (p - methoxyphenyl) - 8H - pyrazolo[5,1-a]isoindol - 8-one, applied at rates of .01 to 1 pound per acre retards the growth of alfalfa, Black Valentine bean, soybeans, chrysanthemum and other plants. It also inhibits the flowering and fruit production of beans, soybeans and chrysanthemum. This chemical has more pronounced effects on the growth of chrysanthemum under short days, indicating that it is affecting the response of plants to day length.

On syrup type sorghum a foliar spray of 1/16 to 3 pounds per acre applied two to eight weeks before harvest increases the sugar content of the sorghum.

At higher rates, such as two to four pounds per acre, this same compound destroys goldenrod, Solidago spp.; red clover, Trifolium praetense; ragweed, Amarosia spp.; and wild carrot, Daucus carota.

Preparation

The aforementioned substituted 3,3a-dihydro-8H-pyrazolo[5,1-a]isoindol-8-ones are prepared in the following manner. Phthalaldehydic acid or substituted acid is treated in the presence of a base with a ketone; i.e., acetophenone or substituted acetophenone. Generally, inert solvents such as ethanol, 2B alcohol, methanol, acetonitrile and benzene are preferred for the reaction along with bases such as potassium and sodium hydroxide. It is desirable to have more than one equivalent of base.

The mixture is stirred for one to six hours at 20 to 80° C., 25 to 35° C. being preferred. The reaction is essentially complete and is so indicated by precipitation of the compound, by disappearance of the peak attributable to the aldehyde group in the infrared spectrum or by other appropriate means. The solution is diluted with water and acidified, usually with concentrated hydrochloric acid, which completes the precipitation of essentially pure 3-substituted phthalide. Further purification can be effected by recrystallization from an appropriate solvent such as benzene, acetonitrile or ethanol.

A mixture of the 3-substituted phthalide and hydrazine, usually as the hydrochloride, sulfate or hydrate, in an inert solvent such as aqueous ethanol or methanol is heated to near reflux. It is desirable to use an excess of one of the reactants. After a few minutes, an excess of triethylamine is added gradually, and the mixture is heated at reflux for one to three hours. The cooled solution is acidified, generally with hydrochloric acid and then reheated at reflux for about thirty minutes. The solution is thereafter cooled, reduced in volume, and diluted with sufficient water to separate essentially pure substituted 3,3a-dihydro-8H-pyrazolo[5,1-a]isoindol-8-ones. Further purification is effected by washing the compound with dilute aqueous base and by recrystallization from an appropriate solvent such as benzene, acetonitrile, ethanol or nitromethane.

Compositions

Compositions of this invention comprise a compound of this invention together with one or more surface-active agents.

The surface-active agent used in this invention can be a wetting, dispersing or an emulsifying agent which will assist dispersion of the compound. The surface-active agent or surfactant can include such anionic, cationic and nonionic agents as have heretofore been generally employed in plant control compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1965) by John W. McCutcheon, Inc.

Suitable surface-active agents for use in compositions of the present invention are: polyethylene glycol fatty acid esters and fatty alkylol amide condensates, alkylaryl sulfonates, fatty alcohol sulfates, dialkyl esters of sodium sulfosuccinate, fatty acid esters of sodium isethionate, polyoxyethylene ethers and thioethers and long chain quaternary ammonium chloride compounds.

Surface-active dispersing agents such as salts of lignin sulfonic acids, low viscosity methyl cellulose, polymerized sodium salts of alkylnaphthalene sulfonic acids are also suitable in the herbicidal compositions of this invention.

Among the more preferred surfactants are the anionic and non-ionic type. Among the anionic surface-active agents, preferred ones are alkali metal or amine salts of alkylbenzene sulfonic acids such as dodecylbenzene sulfonic acid, sodium lauryl sulfate, alkylnaphthalene sulfonates, sodium N-methyl-N-oleoyltaurate, oleic acid ester of sodium isethionate, dioctyl sodium sulfosuccinate, sodium dodecyldiphenyloxide disulfonate. Among the nonionic compounds, preferred members are alkylphenoxy poly(ethyleneoxy)ethanols such as nonylphenol adducts with ethylene oxide; polyethylene oxide adducts to long chain aliphatic alcohols such as trimethylnonyl polyethylene glycol ethers, polyethylene oxide adducts of fatty and rosin acids, long chain alkyl mercaptan adducts with ethylene oxide, and polyethylene oxide adducts with sorbitan fatty acid esters.

In general, less than 10% by weight of the surface-active agents will be used in compositions of this invention and ordinarily the amount of surface-active agents will range from 1–5% but may even be less than 1% by weight.

Additional surface-active agents can be added to the above formulation to increase the ratio of surface-active agent:active agent up to as high as 5:1 by weight. Normally the purpose of adding higher amounts of surfactant is to increase the growth regulant effect of the active compounds. When used at higher rates it is preferred that the surfactant be present in the range of one fifth to five parts surfactant for each one part of active agent.

Plant growth regulant compositions of this invention can contain, in addition to a surfactant, finely divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

Preferred diluents are clays of hydrated aluminum silicate, hydrated aluminum magnesium silicate and hydrated aluminum magnesium iron silicate.

The amount of the finely divided inert solid diluent can vary widely but will generally range from 10 to 98% by weight of the growth retardant composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 90% of a pyrazoloisoindolone.

The pyrazoloisoindolones of this invention can also be formulated as high strength compositions in which the active ingredient can be present in amounts ranging from 90–99%. The remainder of the composition comprises surface-active agents, preferably in amounts of from 0.2 to 2% and diluents, as described above. Such compositions are prepared by blending and grinding the ingredients to obtain a homogeneous powder of fine particle size.

Compositions of these plant growth regulants and inert solid diluents can also be formulated into granules and pellets. In such compositions, the diluent will generally range from 65 to 99% and the active ingredient can range from 1 to 35%. It should be understood that it will not be necessary to include a surfactant in the granular and pelletized composition. To prepare granules the pyrazoloisoindolone can be dissolved in a solvent, and this solution can be sprayed over pre-formed clay granules, expanded vermiculite or the like while agitating the mixture to distribute the active ingredient over and throughout the granular mass. Such granules can range in particle size of from +60 mesh to +4 mesh, and an active ingredient content of 1 to 6% is preferred. It is also possible to make such granules by mixing the finely divided diluent and finely divided pyrazoloisoindolone, for instance by grinding together, and then forming granules by adding water, tumbling and drying the resulting spheres. It is also possible to mix a finely divided pyrazoloisoindolone with granular carriers such as attapulgite or vermiculite and then binding the active ingredient to the carrier by spraying the whole with a non-volatile liquid.

Pellets can be prepared by extruding a mixture which comprises the pyrazoloisoindolone, pelleting clay diluent and water into strands, cutting these, and drying the product. Pellet size can range from 10 mesh to larger shapes such as ⅜ inch cubes. Pellets preferably contain from 5 to 35% of the pyrazoloisoindolone. In addition to the diluents, pelletized and granular compositions can contain additives such as binders, surfactants and the like.

In addition to the formulation described above, suspension concentrates can also be prepared. These formulations are prepared by wet milling the ingredients; i.e., ball milling or by sand grinding using the method described in Hochberg U.S. Patent 2,581,414, issued Aug. 19, 1948 or Littler U.S. Patent 3,060,084, issued Oct. 23, 1962. Using the methods described in these patents, fine particles of the active compounds within the scope of this invention will be dispersed evenly in a diluent. Such compositons normally contain from 15 to 50% active ingredient and are characterized by having particles which are substantially less than 5–20 microns in diameter.

Water extendable oil compositions can also be employed with one or more of the pyrazoloisoindolones of this invention. In these plant growth regulant compositions, surface-active agents and an oil form a liquid which can be conveniently poured and measured. Such liquid concentrates can be mixed with water at the point of application to form a dilute spray containing the herbicide and the surface-active agent. Such compositions have the advantage that the oil will often act as a foam inhibitor and thus reduce the tendency for large amounts of surfactants to form objectionable foam. These oil formulations are dispersions of the pyrazoloisoindolones in finely divided form in non-solvent carriers. A non-solvent carrier is an oil in which the pyrazoloisoindolone has low solubility, for instance, less than about 0.1% at 25° C. Many aliphatic hydrocarbons are examples of such non-solvent carriers. The dispersions are prepared by wet-milling the ingredients, for example, in a ball mill or sand mill. The solutions are prepared by blending and agitating the ingredients, possibly with application of heat.

In these emulsifiable oil concentrates, the pyrazoloisoindolones will be present in amounts ranging from 5 to 35% by weight. Precise concentrations of active agent, of course, will depend on the intended use of the composition. Upon mixing with water at the point of application, the oil concentrate will be diluted so that in the final formulation the active agent will be present in amounts ranging from 0.5% to 2% by weight. It will be understood that emulsifiable compositons will have utility for regulating foliage along highway and railroad rights-of-way, as well as other locations.

It is, of course, also possible to use such oil compositions of pyrazoloisoindolones by extending them with other oils, for example, diesel oil, herbicidal oil, and the like for applications such as railroad rights-of-way.

Formulation with herbicides

The pyrazoloisoindolones of my invention can be formulated with other classes of compounds, producing compositions having advantages over the individual components. Among the known plant growth retardants, modifiers and herbicides which can be combined with the pyrazoloisoindolones of this invention are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea These ureas can be mixed with the pyrazoloisoindolones of this invention in proportions of from 1:4 to 16:1 respectively, the preferred ratio being 1:4 to 8:1.

1-(2-methylcyclohexyl)-3-phenylurea
1-(3-methylcyclohexyl)-3-phenylurea

The above two ureas can be mixed with the pyrazoloisoindolones of this invention in proportions of from 1:4 to 40:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-methylmercapto-4,6-bis(isopropylamino)-s-triazine
2-methoxy-4-ethylamino-6-isopropylamino-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-chloro-4,6-bis(isopropylamino)-s-triazine
2-tert-butylamino-4-ethylamino-6-methylmercapto-s-triazine
2-isopropylamino-4-methoxypropylamino-6-methylmercapto-s-triazine These triazines can be mixed with the pyrazoloisoindolones of this invention in proportions of from 1:4 to 16:1 respectively, the preferred ratio being 1:4 to 8:1.

Phenols 4-cyano-2,6-diiodophenol and its salts
4-cyano-2,6-dibromophenol and its salts
dinitro-o-sec-butylphenol and its salts
pentachlorophenol and its salts These phenols can be mixed with the pyrazoloisoindolones of this invention in the proportions of 1:4 to 20:1 respectively, the preferred ratio being 1:4 to 10:1.

Carboxylic acids and derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
4-amino-3,5,6-trichloropicolinic acid The above carboxylic acids can be mixed with the pyrazoloisoindolones of this invention in the proportion of 1:8 to 8:1, preferably a 1:4 to 4:1 ratio.

2,6-dichlorobenzonitrile

Mixed in a 1:8 to 8:1 ratio, preferably a 1:4 to 4:1 ratio.

Trichloroacetic acid and its salts

Mixed in a 1:2 to 40:1 ratio, preferably a 1:1 to 8:1 ratio.

2,2-dichloropropionic acid and its salts

Mixed in a 1:2 to 8:1 ratio, preferably a 1:2 to 6:1 ratio.

N,N-dipropylthiolcarbamic acid, ethyl ester
n-Propyl-N,N-dipropylthiolcarbamate
N-propyl-N-ethyl-n-butylthiolcarbamate Mixed in a 1:2 to 8:1 ratio, preferably a 1:1 to 4:1 ratio.

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 8:1 ratio, preferably a 1:1 to 4:1 ratio.

2,3,6-trichlorophenylacetic acid and its salts

Mixed in a 1:8 to 8:1 ratio, preferably a 1:4 to 4:1 ratio.

N-isopropyl-N-phenylchloroacetamide
2-chloro-N,N-diallylacetamide
Maleic hydrazide
Succinic acid, monohydrazide with hydrazine
1,1-dimethyl-(2-chloroethyl)trimethylammonium chloride
Tributyl 2,4-dichlorobenzylphosphorium chloride
(4-hydroxycarvacryl)trimethylammonium chloride, ester with 1-piperidinecarboxylic acid Mixed in a 1:4 to 16:1 ratio, preferably a 1:2 to 8:1 ratio.

Inorganic and mixed inorganic-organic salts

These salts can be mixed with the pyrazoloisoindolones of this invention in the below listed proportions.

Calcium propylarsonate
Disodium monomethylarsonate
Octyl-dodecylammoniummethylarsonate Mixed in a 1:4 to 16:1 ratio, preferably a 1:2 to 4:1 ratio.

Sodium arsenite

Mixed in a 1:5 to 40:1 ratio, preferably a 1:4 to 25:1 ratio.

Lead arsenate
Calcium arsenate

Mixed in a 150:1 to 800:1 ratio, preferably a 100:1 to 400:1 ratio.

Sodium tetraborate hydrated, granulated
Sodium metaborate
Sodium pentaborate
Polyborchlorate
Unrefined borate ore such as borasca Mixed in a 6:1 to 1500:1 ratio, preferably a 3:1 to 1000:1 ratio.

Sodium chlorate

Mixed in a 2:1 to 200:1 ratio, preferably a 1:1 to 100:1 ratio.

Ammonium sulfamate

Mixed in a 1:1 to 100:1 ratio, preferably a 1:1 to 50:1 ratio.

Other organic herbicides 5,6-dihydro-(4A-6A)-dipyrido-(1,2-A,2',1'-C) pyrazinium dibromide
1,1'-dimethyl-4,4'-dipyridinium di-(methylsulfate)

Mixed in a 1:10 to 8:1 ratio, preferably a 1:5 to 5:1 ratio.

3-amino-1,2,4-triazole

Mixed in a 1:10 to 10:1 ratio, preferably a 1:5 to 5:1 ratio.

3,6-endooxohexahydrophthalic acid

Mixed in a 1:3 to 20:1 ratio, preferably a 1:2 to 10:1 ratio.

Hexachloroacetone

Mixed in a 1:2 to 32:1 ratio, preferably a 1:1 to 16:1 ratio.

Diphenylacetonitrile
N,N-dimethyl-alpha,alpha-diphenylacetamide
N,N-di-n-propyl-2,6-dinitro-4-trifluoromethylaniline
N,N-di-n-propyl-2,6-dinitro-4-methylaniline
N-methyl-N-n-butyl-2,6-dinitro-4-butyromethylaniline Mixed in a 1:2 to 30:1 ratio, preferably a 1:1 to 8:1 ratio.

O-(2,4-dichlorophenyl)-O-methyl-isopropylphosphoramidothiate
2,3,5,6-tetrachloroterephthalic acid, dimethyl ester
Thio-methyl ester of 2,3,5,6-tetrachloro-4-carbomethoxybenzoic acid Mixed in a 1:2 to 30:1 ratio, preferably a 1:3 to 15:1 ratio.

1-(3,4-dichlorophenyl)-3,5-dimethylhexahydro-1,3,5-triazinone-2
1-phenyl-3-methyl-5-allyl hexahydro-1,3,5-triazinone-2

Mixed in a 1:4 to 16:1 ratio, preferably a 1:4 to 8:1 ratio.

Substituted uracils

These pyrazoloisoindolones can be mixed with substituted uracils, in the proportions listed below.

3-cyclohexyl-6-methyluracil
3-cyclohexyl-6-ethyluracil
3-norbornyl-6-methyluracil
3-cyclopentyl-6-methyluracil
3-isopropyl-5,6-pentamethyleneuracil Mixed in a 1:4 to 16:1 ratio, preferably a 1:2 to 8:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:4 to 16:1 ratio, preferably a 1:4 to 8:1 ratio.

3-cyclohexyl-5-bromouracil
3-cyclohexyl-5-chlorouracil
3-isopropyl-5-bromouracil
3-sec-butyl-5-bromouracil
3-sec-butyl-5-chlorouracil
5-bromo-3-sec-butyl-6-methyluracil
5-bromo-3-sec-butyl-6-methyluracil, sodium salt
5-chloro-3-sec-butyl-6-methyluracil
5-bromo-3-tert-butyl-6-methyluracil
5-chloro-3-tert-butyl-6-methyluracil
5-bromo-3-(1-ethylpropyl)-6-methyluracil
5-chloro-3-(1-ethylpropyl)-6-methyluracil
5-bromo-3-isopropyl-6-methyluracil
5-chloro-3-isopropyl-6-methyluracil
5-bromo-3-cyclohexylmethyl-6-methyluracil
5-chloro-3-cyclohexylmethyl-6-methyluracil
3-cyclohexyl-5-methoxy-6-methyluracil
3-sec-butyl-5,6-dimethyluracil
5-bromo-6-methyl-3-norbornylmethyluracil
3-sec-butyl-6-methyl-5-nitrouracil
3-cyclohexyl-5,6-dimethyluracil
5-bromo-3-cyclohexyl-6-methyluracil
5-chloro-3-phenyl-6-methyluracil
5-bromo-6-methyl-3-(1-piperidino)uracil
5-chloro-6-methyl-3-(1-piperidino)uracil
5-bromo-6-methyl-3-(1-pyrrolidinyl)uracil
5-chloro-6-methyl-3-(1-pyrrolidinyl)uracil
5-bromo-6-methyl-3-(hexahydro-1-azepinyl)uracil
5-chloro-6-methyl-3-(hexahydro-1-azepinyl)uracil
6-methyl-3-(hexahydro-1-azepinyl)uracil
5-bromo-6-methyl-3-(4-morpholino)uracil Mixed in a 1:2 to 8:1 ratio, preferably a 1:1 to 4:1 ratio.

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 16:1 ratio, preferably a 1:4 to 8:1 ratio.

Application

The compounds of my invention are applied to the locus of growth of the plants to be affected. A locus of growth is meant the immediate area where the plant is developing and growing. This includes pre-emergence and post-emergence application.

Low rates of application of the active ingredient from 0.0025 to 8 pounds per acre provides a means for regulating the growth of plants; e.g., growth retardation which includes epinasty, delayed flowering, preventing of fruit set carbohydrate enrichment and control of axillary growth. At higher rates of application, from 10 to 40 pounds per acre, compounds of this invention exhibit herbicidal activity on some plant species under specific growth conditions. However, on other plant species these compounds are herbicidal at a rate of two pounds per acre or even lower. The compound is applied with conventional agricultural equipment and is usually applied in one of the compositions set forth above. The actual rate of active ingredient used, of course, must depend on the particular situation, i.e., the actual plant species, its vigor, the time of year and the condition of the soil. These slight variations will be well known to one skilled in the art.

The following examples are provided to more clearly explain this invention. All percents are by weight unless otherwise indicated.

EXAMPLE 1.—PREPARATION OF 3,3a-DIHYDRO-2-(p - METHOXYPHENYL)-8H-PYRAZOLO[5,1-a] ISOINDOL-8-ONE

To 237 parts of ethanol containing 75 parts by weight of 4-methoxyacetophenone and 75 parts of phthalaldehydic acid is added gradually 56 parts of potassium hydroxide in 50 parts of water. The mixture is stirred for a period of about one hour. The solution is diluted with water and acidified with concentrated hydrochloric acid to give 103 parts of essentially pure 3-(p-methoxyphenacyl)phthalide. A mixture of 141 parts by weight of 3-(p-methoxyphenacyl)phthalide and 105 parts of hydrazine hydrochloride in 914 parts of 60% aqueous ethanol is heated to near reflux. After a few minutes, 202 parts of triethylamine is added gradually, and the mixture is heated at reflux for a period of three hours. The cooled solution is acidified with concentrated hydrochloric acid and then reheated at reflux for about one-half hour. After the mixture is cooled, concentrated and diluted with about 500 parts of water, essentially pure 3,3a-dihydro-2-(p-methoxyphenyl)-8H - pyrazolo[5,1-a] isoindol-8-one separates; M.P. 177–178.5° C.; IR Absorption 5.88µ; proton n.m.r. consistent with structure.

*Analysis.*—Calc'd for $C_{17}H_{14}N_2O_2$: C, 73.38; H, 5.04; N, 10.07. Found: C, 73.23; H, 5.10; N, 9.89.

|  | Percent |
|---|---|
| 3,3a-dihydro - 2 - (p-methoxyphenyl)-8H-pyrazolo-[5,1-a]isoindol-8-one | 80.0 |
| Alkylnaphthalene sulfonic acid, Na salt | 1.5 |
| Partially desulfonated sodium lignin sulfonate | 2.0 |
| Synthetic fine silica | 16.5 |

The above components are first mixed in a ribbon blender, then micropulverized until substantially all particles are below 50 microns, and reblended to yield a readily dispersible wettable powder for application as an aqueous spray.

Five pounds of this wettable powder is mixed with a small quantity of water and a slurry formed. The slurry is then diluted to 100 gallons with water and 0.2% of dodecyl ether of polyethylene glycol is added.

This suspension is sprayed on recently trimmed trees and brush, including privet and Lombardy poplar and sumac along a power line right-of-way. The application is made when the trees are in leaf and the foliage is sprayed to run-off. This treatment greatly retards the growth of the trimmed species. The labor required to maintain the power line right-of-way is reduced.

EXAMPLES 2–179

The following compounds are made in like manner as the 3,3a-dihydro - 2 - (p - methoxyphenyl)-8H-pyrazolo-[5,1 - a]isoindol - 8 - one of Example 1 by substituting equivalent amounts of the ketone and substituted phthalide below for the 4-methoxyacetophenone and 3-(p-methoxyphenacyl)phthalide respectively of Example 1. The phthalaldehydic acid reactant of Example 1 is used in each of the following preparations except when specifically substituted phthaldehydic acids are listed as in Examples 158–179. All the compounds are formulated and applied in like manner to provide plant growth retardation.

| Ex. | Ketone | Substituted Phthalide | Substituted Pyrazolo[5,1-a]isoindolones |
|---|---|---|---|
| 2 | 1-acetylnaphthalene | 3-[2-(1-naphthyl)-2-oxoethyl]phthalide | 3,3a-dihydro-2-(1-naphthyl)-8H-pyrazolo[5,1-a]isoindol-8-one. |
| 3 | 2-acetylnaphthalene | 3-[2-(2-naphthyl)-2-oxoethyl]phthalide | 3,3a-dihydro-2-(2-naphthyl)-8H-pyrazolo[5,1-a]isoindol-8-one. |
| 4 | 9-acetylphenanthrene | 3-[2-oxo-2-(9-phenanthryl)ethyl]phthalide | 3,3a-dihydro-2-(9-phenanthryl)-8H-pyrazolo[5,1-a]isoindol-8-one. |
| 5 | 3,3-dimethyl-2-butanone | 3-(3,3-dimethyl-2-oxobutyl)phthalide | 2-tert-butyl-3,3a-dihydro-8H-pyrazolo[5,1-a]isoindol-8-one. |
| 6 | 3-buten-2-one | 3-(3-butenyl-2-oxo)phthalide | 3,3a-dihydro-2-vinyl-8H-pyrazolo-[5,1-a]-isoindol-8-one. |
| 7 | 4-methyl-3-penten-2-one | 3-(4-methyl-2-oxo-3-pentenyl)phthalide | 3,3a-dihydro-2-(2-methyl-1-propenyl)-8H-pyrazolo[5,1-a]isoindol-8-one. |
| 8 | 3-penten-2-one | 3-(2-oxo-3-pentenyl)phthalide | 3,3a-dihydro-2-(1-propenyl)-8H-pyrazolo[5,1-a]isoindol-8-one. |
| 9 | 4-phenyl-3-buten-2-one | 3-(2-oxo-4-phenyl-3-butenyl)phthalide | 3,3a-dihydro-2-styryl-8H-pyrazolo[5,1-a]-isoindol-8-one. |
| 10 | 4-p-tolyl-3-buten-2-one | 3-(2-oxo-4-p-tolyl-3-butenyl)phthalide | 3,3a-dihydro-2-(p-methylstyryl)-8H-pyrazolo[5,1-a]isoindol-8-one. |
| 11 | 4-m-tolyl-3-buten-2-one | 3-(2-oxo-4-m-tolyl-3-butenyl)phthalide | 3,3a-dihydro-2-(m-methylstyryl)-8H-pyrazolo[5,1-a]isoindol-8-one. |
| 12 | 4-p-chlorophenyl-3-buten-2-one | 3-(4-p-chlorophenyl-2-oxo-3-butenyl)phthalide. | 2-(p-chlorostyryl)-3,3a-dihydro-8H-pyrazolo[5,1-a]isoindol-8-one. |
| 13 | 4-m-chlorophenyl-3-buten-2-one | 3-(4-m-chlorophenyl-2-oxo-3-butenyl)phthalide. | 2-(m-chlorostyryl)-3,3a-dihydro-8H-pyrazolo[5,1-a]isoindol-8-one. |
| 14 | 2'-chloroacetophenone | 3-(o-chlorophenacyl)phthalide | 2-(o-chlorophenyl)-3,3a-dihydro-8H-pyrazolo[5,1-a]isoindol-8-one. |
| 15 | 3'-chloroacetophenone | 3-(m-chlorophenacyl)phthalide | 2-(m-chlorophenyl)-3,3a-dihydro-8H-pyrazolo[5,1-a]isoindol-8-one. |
| 16 | 4'-chloroacetophenone | 3-(p-chlorophenacyl)phthalide | 2-(p-chlorophenyl)-3,3a-dihydro-8H-pyrazolo[5,1-a]isoindol-8-one. |
| 17 | 2'-fluoroacetophenone | 3-(o-fluorophenacyl)phthalide | 2-(o-fluorophenyl)-3,3a-dihydro-8H-pyrazolo[5,1-a]isoindol-8-one. |
| 18 | 3'-fluoroacetophenone | 3-(m-fluorophenacyl)phthalide | 2-(m-fluorophenyl)-3,3a-dihydro-8H-pyrazolo[5,1-a]isoindol-8-one. |
| 19 | 4'-fluoroacetophenone | 3-(p-fluorophenacyl)phthalide | 2-(p-fluorophenyl)-3,3a-dihydro-8H-pyrazolo[5,1-a]isoindol-8-one. |
| 20 | 2'-bromoacetophenone | 3-(o-bromophenacyl)phthalide | 2-(o-bromophenyl)-3,3a-dihydro-8H-pyrazolo[5,1-a]isoindol-8-one. |
| 21 | 3'-bromoacetophenone | 3-(m-bromophenacyl)phthalide | 2-(m-bromophenyl)-3,3a-dihydro-8H-pyrazolo[5,1-a]isoindol-8-one. |
| 22 | 4'-bromoacetophenone | 3-(p-bromophenacyl)phthalide | 2-(p-bromophenyl)-3,3a-dihydro-8H-pyrazolo[5,1-a]isoindol-8-one. |
| 23 | 4'-iodoacetophenone | 3-(p-iodophenacyl)phthalide | 2-(p-iodophenyl)-3,3a-dihydro-8H-pyrazolo[5,1-a]isoindol-8-one. |
| 24 | 2'-methylacetophenone | 3-(o-methylphenacyl)phthalide | 3,3a-dihydro-2-(o-tolyl)-8H-pyrazolo[5,1-a]isoindol-8-one. |
| 25 | 3'-methylacetophenone | 3-(m-methylphenacyl)phthalide | 3,3a-dihydro-2-(m-tolyl)-8H-pyrazolo[5,1-a]isoindol-8-one. |
| 26 | 4'-methylacetophenone | 3-(p-methylphenacyl)phthalide | 3,3a-dihydro-2-(p-tolyl)-8H-pyrazolo[5,1-a]isoindol-8-one. |
| 27 | 4'-ethylacetophenone | 3-(p-ethylphenacyl)phthalide | 2-(p-ethylphenyl)-3,3a-dihydro-8H-pyrazolo[5,1-a]isoindol-8-one. |
| 28 | 4'-isopropylacetophenone | 3-(p-isopropylphenacyl)phthalide | 2-(p-cumyl)-3,3a-dihydro-8H-pyrazolo[5,1-a]isoindol-8-one. |

| Ex. | Ketone | Substituted Phthalide | Substituted Pyrazolo[5,1-a]isoindolones |
|---|---|---|---|
| 29 | 4'-tert-butylacetophenone | 3-(p-tert-butylphenacyl)phthalide | 2-(p-tert-butylphenyl)-3,3a-dihydro-8H-pyrazolo[5,1-a]isoindol-8-one. |
| 30 | 4'-n-butylacetophenone | 3-(p-n-butylphenacyl)phthalide | 2-(p-n-butylphenyl)-3,3a-dihydro-8H-pyrazolo[5,1-a]isoindol-8-one. |
| 31 | Acetophenone | 3-phenacylphthalide | 3,3a-dihydro-2-phenyl-8H-pyrazolo[5,1-a]isoindol-8-one. |
| 32 | p-tert-butoxy-n-hexanophenone | 3-(2-p-tert-butoxyphenyl-1-n-butyl-2-oxoethyl)phthalide | 2-(p-tert-butoxyphenyl)-3-n-butyl-3,3a-dihydro-8H-pyrazolo[5,1-a]isoindol-8-one. |
| 33 | 3'-methoxyacetophenone | 3-(m-methoxyphenacyl)phthalide | 3,3a-dihydro-2-(m-methoxyphenyl)-8H-pyrazolo[5,1-a]isoindol-8-one. |
| 34 | 2'-methoxyacetophenone | 3-(o-methoxyphenacyl)phthalide | 3,3a-dihydro-2-(o-methoxyphenyl)-8H-pyrazolo[5,1-a]isoindol-8-one. |
| 35 | 4'-ethoxyacetophenone | 3-(p-ethoxyphenacyl)phthalide | 2-(p-ethoxyphenyl)-3,3a-dihydro-8H-pyrazolo[5,1-a]isoindol-8-one. |
| 36 | 4'-propoxyacetophenone | 3-(p-propoxyphenacyl)phthalide | 3,3a-dihydro-2-(p-propoxyphenyl)-8H-pyrazolo[5,1-a]isoindol-8-one. |
| 37 | 4'-isopropoxyacetophenone | 3-(p-isopropoxyphenacyl)-phthalide | 3,3a-dihydro-2-(p-isopropoxyphenyl)-8H-pyrazolo[5,1-a]isoindol-8-one. |
| 38 | 4'-butoxyacetophenone | 3-(p-butoxyphenacyl)phthalide | 2-(p-butoxyphenyl)-3,3a-dihydro-8H-pyrazolo[5,1-a]isoindol-8-one. |
| 39 | 4'-methylthioacetophenone | 3-(p-methylthiophenacyl)phthalide | 3,3a-dihydro-2-(p-methylthiophenyl)-8H-pyrazolo[5,1-a]isoindol-8-one. |
| 40 | 4'-sec-butylthioacetophenone | 3-(p-sec-butylthiophenacyl)phthalide | 2-(p-sec-butylthiophenyl)-3,3a-dihydro-8H-pyrazolo[5,1-a]isoindol-8-one. |
| 41 | 4'-nitroacetophenone | 3-(p-nitrophenacyl)phthalide | 3,3a-dihydro-2-(p-nitrophenyl)-8H-pyrazolo[5,1-a]isoindol-8-one. |
| 42 | 3'-nitroacetophenone | 3-(m-nitrophenacyl)phthalide | 3,3a-dihydro-2-(m-nitrophenyl)-8H-pyrazolo[5,1-a]isoindol-8-one. |
| 43 | 2'-nitroacetophenone | 3-(o-nitrophenacyl)phthalide | 3,3a-dihydro-2-(o-nitrophenyl)-8H-pyrazolo[5,1-a]isoindol-8-one. |
| 44 | 4'-methylsulfonylacetophenone | 3-(p-methylsulfonylphenacyl)phthalide | 3,3a-dihydro-2-(p-methylsulfonylphenyl)-8H-pyrazolo[5,1-a]isoindol-8-one. |
| 45 | 4'-trifluoromethylacetophenone | 3-(p-trifluoromethylphenacyl)phthalide | 3,3a-dihydro-2-(p-trifluoromethylphenyl)-8H-pyrazolo[5,1-a]isoindol-8-one. |
| 46 | 3'-trifluoromethylacetophenone | 3-(m-trifluoromethylphenacyl)phthalide | 3,3a-dihydro-2-(m-trifluoromethylphenyl)-8H-pyrazolo[5,1-a]isoindol-8-one. |
| 47 | 4'-cyanoacetophenone | 3-(p-cyanophenacyl)phthalide | 2-(p-cyanophenyl)-3,3a-dihydro-8H-pyrazolo[5,1-a]isoindol-8-one. |
| 48 | 3'-cyanoacetophenone | 3-(m-cyanophenacyl)phthalide | 2-(m-cyanophenyl)-3,3a-dihydro-8H-pyrazolo[5,1-a]isoindol-8-one. |
| 49 | 9-Acetone | 1,3-diphthalidyl-2-propanone | 3,3a-dihydro-2-(3-phthalidylmethyl)-8H-pyrazolo[5,1-a]isoindol-8-one. |
| 50 | 2-butanone | 1,3-diphthalidyl-2-butanone | 3,3a-dihydro-2-[1-(3-phthalidyl)ethyl]-8H-pyrazolo[5,1-a]isoindol-8-one. |
| 51 | 2-pentanone | 1,3-diphthalidyl-2-pentanone | 3a-dihydro-2-[1-(3-phthalidyl)propyl]-8H-pyrazolo[5,1-a]isoindol-8-one. |
| 52 | 2-butanone | 1,3-diphthalidyl-2-butanone | 3,3a-dihydro-3-methyl-2-(3-phthalidylmethyl)-8H-pyrazolo[5,1-a]isoindol-8-one. |
| 53 | 3-pentanone | 2,4-diphthalidyl-3-pentanone | 3,3a-dihydro-3-methyl-2-[1-(3-phthalidyl)ethyl]-8H-pyrazolo[5,1-a]isoindol-8-one. |
| 54 | 3,3-dimethyl-2-dodecanone | 3-(3,3-dimethyl-2-oxododecyl)phthalide | 3,3a-dihydro-2-(2-methyl-2-hendecyl)-8H-pyrazolo[5,1-a]isoindol-8-one. |
| 55 | 3',5'-difluoroacetophenone | 3-(3,5-difluorophenacyl)phthalide | 2-(3,5-difluorophenyl)-3,3a-dihydro-8H-pyrazolo[5,1-a]isoindol-8-one. |
| 56 | 2'-chloro-4'-fluoroacetophenone | 3-(2-chloro-4-fluorophenacyl)phthalide | 2-(2-chloro-4-fluorophenyl)-3,3a-dihydro-8H-pyrazolo[5,1-a]isoindol-8-one. |
| 57 | 2'-bromo-4'-fluoroacetophenone | 3-(2-bromo-4-fluorophenacyl)phthalide | 2-(2-bromo-4-fluorophenyl)-3,3a-dihydro-8H-pyrazolo[5,1-a]isoindol-8-one. |
| 58 | 2'-fluoro-4'-iodoacetophenone | 3-(2-fluoro-4-iodophenacyl)phthalide | 2-(2-fluoro-4-iodophenyl)-3,3a-dihydro-8H-pyrazolo[5,1-a]isoindol-8-one. |
| 59 | 2',4',5'-trichloroacetophenone | 3-(2,4,5-trichlorophenacyl)phthalide | 3,3a-dihydro-2-(2,4,5-trichlorophenyl)-8H-pyrazolo[5,1-a]isoindol-8-one. |
| 60 | 2'-4'-dichloroacetophenone | 3-(2,4-dichlorophenacyl)phthalide | 2-(2,4-dichlorophenyl)-3,3a-dihydro-8H-pyrazolo[5,1-a]isoindol-8-one. |
| 61 | 2',5'-dichloroacetophenone | 3-(2,5-dichlorophenacyl)phthalide | 2-(2,5-dichlorophenyl)-3,3a-dihydro-8H-pyrazolo[5,1-a]isoindol-8-one. |
| 62 | 3',4'-dichloroacetophenone | 3-(3,4-dichlorophenacyl)phthalide | 2-(3,4-dichlorophenyl)-3,3a-dihydro-8H-pyrazolo[5,1-a]isoindol-8-one. |
| 63 | 4'-chloro-2'-iodoacetophenone | 3-(4-chloro-2-iodophenacyl)phthalide | 2-(4-chloro-2-iodophenyl)-3,3a-dihydro-8H-pyrazolo[5,1-a]isoindol-8-one. |
| 64 | 2'-bromo-4'-chloroacetophenone | 3-(2-bromo-4-chlorophenacyl)phthalide | 2-(2-bromo-4-chlorophenyl)-3,3a-dihydro-8H-pyrazolo[5,1-a]isoindol-8-one. |
| 65 | 3',4',5'-trichloroacetophenone | 3-(3,4,5-trichlorophenacyl)phthalide | 3,3a-dihydro-2-(3,4,5-trichlorophenyl)-8H-pyrazolo[5,1-a]isoindol-8-one. |
| 66 | 2',4'-dibromoacetophenone | 3-(2,4-dibromophenacyl)phthalide | 2-(2,4-dibromophenyl)-3,3a-dihydro-8H-pyrazolo[5,1-a]isoindol-8-one. |
| 67 | Benzoylacetonitrile | 3-(1-cyano-2-oxo-2-phenylethyl)-phthalide | 3,3a-dihydro-8-oxo-3-phenyl-8H-pyrazolo[5,1-a]isoindol-3-carbonitrile. |
| 68 | 4'-bromo-2'-iodoacetophenone | 3-(2-iodo-4-bromophenacyl)phthalide | 2-(2-iodo-4-bromophenyl)-3,3a-dihydro-8H-pyrazolo[5,1-a]isoindol-8-one. |
| 69 | 2'-trifluoromethylacetophenone | 3-(o-trifluoromethylphenacyl)phthalide | 3,3a-dihydro-2-(o-trifluoromethylphenyl)-8H-pyrazolo[5,1-a]isoindol-8-one. |
| 70 | 4'-bromo-3',5'-dichloroacetophenone | 3-(4-bromo-3,5-dichlorophenacyl)phthalide | 2-(4-bromo-3,5-dichlorophenyl)-3,3a-dihydro-8H-pyrazolo[5,1-a]isoindol-8-one. |
| 71 | 4'-fluoro-2'-methylacetophenone | 3-(4-fluoro-2-methylphenacyl)phthalide | 2-(4-fluoro-2-methylphenyl)-3,3a-dihydro-8H-pyrazolo[5,1-a]isoindol-8-one. |
| 72 | 2'-tert-butyl-4'-fluoroacetophenone | 3-(2-tert-butyl-4-fluorophenacyl)phthalide | 2-(2-tert-butyl-4-fluorophenyl)-3,3a-dihydro-8H-pyrazolo[5,1-a]isoindol-8-one. |
| 73 | 4'-chloro-2'-methylacetophenone | 3-(4-chloro-2-methylphenacyl)phthalide | 2-(4-chloro-2-methylphenyl)-3,3a-dihydro-8H-pyrazolo[5,1-a]isoindol-8-one. |
| 74 | 4'-chloro-2'-ethylacetophenone | 3-(4-chloro-2-ethylphenacyl)phthalide | 2-(4-chloro-2-ethylphenyl)-3,3a-dihydro-8H-pyrazolo[5,1-a]isoindol-8-one. |
| 75 | 4'-chloro-2'-isopropylacetophenone | 3-(4-chloro-2-isopropylphenacyl)phthalide | 2-(4-chloro-2-isopropylphenyl)-3,3a-dihydro-8H-pyrazolo[5,1-a]isoindol-8-one. |
| 76 | 2'-n-butyl-4'-chloroacetophenone | 3-(2-n-butyl-4-chlorophenacyl)phthalide | 2-(2-n-butyl-4-chlorophenyl)-3,3a-dihydro-8H-pyrazolo[5,1-a]isoindol-8-one. |
| 77 | 3'-bromo-4'-methylacetophenone | 3-(3-bromo-4-methylphenacyl)phthalide | 2-(3-bromo-4-methylphenyl)-3,3a-dihydro-8H-pyrazolo[5,1-a]isoindol-8-one. |
| 78 | 4'-bromo-2'-n-butylacetophenone | 3-(4-bromo-2-n-butylphenacyl)phthalide | 2-(4-bromo-2-n-butylphenyl)-3,3a-dihydro-8H-pyrazolo[5,1-a]isoindol-8-one. |
| 79 | 4'-iodo-2'-methylacetophenone | 3-(4-iodo-2-methylphenacyl)phthalide | 3,3a-dihydro-2-(4-iodo-2-methylphenyl)-8H-pyrazolo[5,1-a]isoindol-8-one. |
| 80 | 2'-sec-butyl-4'-iodoacetophenone | 3-(2-sec-butyl-4-iodophenacyl)phthalide | 2-(2-sec-butyl-4-iodophenyl)-3,3a-dihydro-8H-pyrazolo[5,1-a]isoindol-8-one. |
| 81 | 3',5'-dimethyl-4'-fluoroacetophenone | 3-(3,5-dimethyl-4-fluorophenacyl)phthalide | 2-(3,5-dimethyl-4-fluorophenyl)-3,3a-dihydro-8H-pyrazolo[5,1-a]isoindol-8-one. |
| 82 | 3',5'-di-tert-butyl-4'-fluoroacetophenone | 3-(3,5-di-tert-butyl-4-fluorophenacyl)-phthalide. | 2-(3,5-di-tert-butyl-4-fluorophenyl)-3,3a-dihydro-8H-pyrazolo[5,1-a]isoindol-8-one. |
| 83 | 5'-chloro-3'-4'-dimethylacetophenone | 3-(5-chloro-3,4-dimethylphenacyl)phthalide. | 2-(5-chloro-3,4-dimethylphenyl)-3,3a-dihydro-8H-pyrazolo[5,1-a]isoindol-8-one. |

| Ex. | Ketone | Substituted Phthalide | Substituted Pyrazolo[5,1-a]isoindolones |
|---|---|---|---|
| 84 | 3',4'-dichloro-5'-methylacetophenone | 3-(3,4-dichloro-5-methylphenacyl) phthalide. | 2-(3,4-dichloro-5-methylphenyl)-3,3a-dihydro-8H-pyrazolo[5,1-a]isoindol-8-one. |
| 85 | 3'-bromo-2'-5'-dimethylacetophenone | 3-(3-bromo-2,5-dimethylphenacyl) phthalide. | 2-(3-bromo-2,5-dimethylphenyl)-3,3a-dihydro-8H-pyrazolo[5,1-a]isoindol-8-one. |
| 86 | 3',5'-di-n-butyl-4'-bromoacetophenone | 3-(3,5-di-n-butyl-4-bromophenacyl) phthalide. | 2-(3,5-di-n-butyl-4-bromophenyl)-3,3a-dihydro-8H-pyrazolo[5,1-a]isoindol-8-one. |
| 87 | 3',5'-dimethyl-4'-iodoacetophenone | 3-(3,5-dimethyl-4-iodophenacyl)phthalide | 2-(3,5-dimethyl-4-iodophenyl)-3,3a-dihydro-8H-pyrazolo[5,1-a]isoindol-8-one. |
| 88 | 3',5'-di-n-butyl-4'-iodoacetophenone | 3-(3,5-di-n-butyl-4-iodophenacyl)phthalide. | 2-(3,5-di-n-butyl-4-iodophenyl)-3,3a-dihydro-8H-pyrazolo[5,1-a]isoindol-8-one. |
| 89 | 2'-fluoro-4'-methoxyacetophenone | 3-(2-fluoro-4-methoxyphenacyl)phthalide | 2-(2-fluoro-4-methoxyphenyl)-3,3a-dihydro-8H-pyrazolo[5,1-a]isoindol-8-one. |
| 90 | 2'-n-butoxy-4'-fluoroacetophenone | 3-(2-n-butoxy-4-fluorophenacyl)phthalide | 2-(2-n-butoxy-4-fluorophenyl)-3,3a-dihydro-8H-pyrazolo[5,1-a]isoindol-8-one. |
| 91 | 4'-chloro-2'-methoxyacetophenone | 3-(4-chloro-2-methoxyphenacyl)phthalide | 2-(4-chloro-2-methoxyphenyl)-3,3a-dihydro-8H-pyrazolo[5,1-a]isoindol-8-one. |
| 92 | p-Chlorobenzoylacetonitrile | 3-(1-cyano-2-oxo-2-pchlorophenylethyl) phthalide. | 3,3a-dihydro-8-oxo-3-p-chlorophenyl-8H-pyrazolo[5,1-a]isoindol-3-carbonitrile. |
| 93 | 4'-chloro-2'-n-propoxyacetophenone | 3-(4-chloro-2-n-propoxyphenacyl)phthalide. | 2-(4-chloro-2-n-propoxyphenyl)-3,3a-dihydropyrazolo[5,1-a]isoindol-8-one. |
| 94 | 2'-tert-butoxy-4'-chloroacetophenone | 3-(2-tert-butoxy-4-chlorophenacyl)phthalide. | 3-(2-tert-butoxy-4-chlorophenyl)-3,3a-dihydro-8H-pyrazolo[5,1-a]isoindol-8-one. |
| 95 | 2'-bromo-4'-methoxyacetophenone | 3-(2-bromo-4-methoxyphenacyl)phthalide. | 2-(2-bromo-4-methoxyphenyl)-3,3a-dihydro-8H-pyrazolo[5,1-a]isoindol-8-one. |
| 96 | 4'-bromo-2'-butoxyacetophenone | 3-(4-bromo-2-butoxyphenacyl)phthalide | 2-(4-bromo-2-butoxyphenyl)-3,3a-dihydro-8H-pyrazolo[5,1-a]isoindol-8-one. |
| 97 | 2'-iodo-4'-methoxyacetophenone | 3-(2-iodo-4-methoxyphenacyl)phthalide | 3,3a-dihydro-2-(2-iodo-4-methoxyphenyl)-8H-pyrazolo[5,1-a]isoindol-8-one. |
| 98 | 4'-sec-butoxy-2'-iodoacetophenone | 3-(4-sec-butoxy-2-iodophenacyl)phthalide | 2-(4-sec-butoxy-2-iodophenyl)-3,3a-dihydro-8H-pyrazolo[5,1-a]isoindol-8-one. |
| 99 | 2',4'-dimethylacetophenone | 3-(2,4-dimethylphenacyl)phthalide | 3,3a-dihydro-2-(2,4-xylyl)-8H-pyrazolo[5,1-a]isoindol-8-one. |
| 100 | 2',5'-dimethylacetophenone | 3-(2,5-dimethylphenacyl)phthalide | 3,3a-dihydro-2-(2,5-xylyl)-8H-pyrazolo[5,1-a]isoindol-8-one. |
| 101 | 3'-4'-dimethylacetophenone | 3-(3,4-dimethylphenacyl)phthalide | 3,3a,-dihydro-2-(3,4-xylyl)-8H-pyrazolo[5,1-a]isoindol-8-one. |
| 102 | 4'-ethyl-2'-methylacetophenone | 3-(4-ethyl-2-methylphenacyl)phthalide | 2-(4-ethyl-2-methylphenyl)-3,3a-dihydro-8H-pyrazolo[5,1-a]isoindol-8-one. |
| 103 | 5'-isopropyl-2'-methylacetophenone | 3-(5-isopropyl-2-methylphenacyl)phthalide. | 3,3a-dihydro-2-(5-isopropyl-2-methylphenyl)-8H-pyrazolo[5,1-a]isoindol-8-one. |
| 104 | 5'-tert-butyl-3'-methylacetophenone | 3-(5-tert-butyl-3-methylphenacyl)phthalide. | 2-(5-tert-butyl-3-methylphenyl)-3,3a-dihydro-8H-pyrazolo[5,1-a]isoindol-8-one. |
| 105 | 3',5'-di-tert-butylacetophenone | 3-(3-5-di-tert-butylphenacyl)phthalide | 2-(3,5-di-tert-butylphenyl)-3,3a-dihydro-8H-pyrazolo[5,1-a]isoindol-8-one. |
| 106 | 3',4',5'-trimethylacetophenone | 3-(3,4,5-trimethylphenacyl)phthalide | 3,3a-dihydro-2-(3,4,5-trimethylphenyl)-8H-pyrazolo[5,1-a]isoindol-8-one. |
| 107 | 4'-tert-butyl-2',6'-dimethylacetophenone. | 3-(4-tert-butyl-2,6-dimethylphenacyl) phthalide. | 2-(4-tert-butyl-2,6-dimethylphenyl)-3,3a-dihydro-8H-pyrazolo[5,1-a]isoindol-8-one. |
| 108 | 4'-methoxy-2'-methylacetophenone | 3-(4-methoxy-2-methylphenacyl)phthalide. | 3,3a-dihydro-2-(4-methoxy-2-methylphenyl)-8H-pyrazolo[5,1-a]isoindol-8-one. |
| 109 | 5'-n-butoxy-3'-methylacetophenone | 3-(5-n-butoxy-3-methylphenacyl)phthalide. | 2-(5-n-butoxy-3-methylphenyl)-3,3a-dihydro-8H-pyrazolo[5,1-a]isoindol-8-one. |
| 110 | 5'-n-butoxy-3'-n-butylacetophenone | 3-(5-n-butoxy-3-n-butylphenacyl)phthalide. | 2-(5-n-butoxy-3-n-butylphenyl)-3,3a-dihydro-8H-pyrazolo[5,1-a]isoindol-8-one. |
| 111 | 2',4'-dimethoxyacetophenone | 3-(2,4-dimethoxyphenacyl)phthalide | 2-(2-4-dimethoxyphenyl)-3,3a-dihydro-8H-pyrazolo[5,1-a]isoindol-8-one. |
| 112 | 2',5-dimethoxyacetophenone | 3-(2,5-dimethoxyphenacyl)phthalide | 2-(2,5-dimethoxyphenyl)-3,3a-dihydro-8H-pyrazolo[5,1-a]isoindol-8-one. |
| 113 | 5'-n-butoxy-3'-methoxyacetophenone | 3-(5nbutoxy-3-methoxyhenacyl)phthalide | 2-(5-n-butoxy-3-methoxyphenyl)-3,3a-dihydro-8H-pyrazolo[5,1-a]isoindol-8-one. |
| 114 | 3',5'-di-n-butoxyacetophenone | 3-(3,5-di-n-butoxyphenacy)phthalide | 2-(3,5-di-n-butoxyphenyl)-3,3a-dihydro-8H-pyrazolo([5,1-a]isoindol-8-one. |
| 115 | 3',4'-5'-trimethoxyacetophenone | 3-(3,4,5-trimethoxyphenacyl)phthalide | 3,3a-dihydro-2-(3,4,5-trimethoxyphenyl)-8H-pyrazolo[5,1-a]isoindol-8-one. |
| 116 | 4'-fluoro-2'-methylthioacetophenone | 3-(4-fluoro-2-methylthiophenacyl)phthalide. | 2-(4-fluoro-2-methylthiophenyl)-3,3a-dihydro-8H-pyrazolo[5,1-a]isoindol-8-one. |
| 117 | 5'-tert-butylthio-3'-fluoroacetophenone. | 3-(5-tert-butylthio-3-fluorophenacyl) phthalide. | 2-(5-tert-butylthio-3-fluorophenyl)-3,3a-dihydro-8H-pyrazolo[5,1-a]isoindol-8-one. |
| 118 | 4'-chloro-2'-methylthioacetophenone | 3-(4-chloro-2-methylthiophenacyl)phthalide. | 2-(4-chloro-2-methylthiophenyl)-3,3a-dihydro-8H-pyrazolo[5,1-a]isoindol-8-one. |
| 119 | 5'-tert-butylthio-3'-chloroacetophenone | 3-(5-tert-butylthio-3-chlorophenacyl) phthalide. | 2-(5-tert-butylthio-3-chlorophenyl)-3,3a-dihydro-8H-pyrazolo[5,1-a]isoindol-8-one. |
| 120 | 2'-bromo-4'-methylthioacetophenone | 3-(2-bromo-4-methylthiophenacyl) phthalide. | 2-(2-bromo-4-methylthiophenyl)-3,3a-dihydro-8H-pyrazolo[5,1-a]isoindol-8-one. |
| 121 | 4'-bromo-3'-n-butylthioacetophenone | 3-(4-bromo-3-n-butylthiophenacyl) phthalide. | 2-(4-bromo-3-n-butylthiophenyl)-3,3a-dihydro-8H-pyrazolo[5,1-a]isoindol-8-one. |
| 122 | 4'-iodo-2'-methylthioacetophenone | 3-(4-iodo-2-methylthiophenacyl)phthalide. | 3,3a-dihydro-2-(4-iodo-2-methylthiophenyl)-8H-pyrazolo[5,1-a]isoindol-8-one. |
| 123 | 5'-sec-butylthio-3'-iodoacetophenone | 3-(5-sec-butylthio-3-iodophenacyl)phthalide. | 2-(5-sec-butylthio-3-iodophenyl)-3,3a-dihydro-8H-pyrazolo[5,1-a]isoindol-8-one. |
| 124 | 4'-methyl-2'-methylthioacetophenone | 3-(4-methyl-2-methylthiophenacyl) phthalide. | 3,3a-dihydro-2-(4-methyl-2-methylthiophenyl)-8H-pyrazolo[5,1-a]isoindol-8-one. |
| 125 | 4'-sec-butyl-2'-methylthioacetophenone. | 3-(4-sec-butyl-2-methylthiophenacyl) phthalide. | 2-(4-sec-butyl-2-methylthiophenyl)-3,3a-dihydro-8H-pyrazolo[5,1-a]isoindol-8-one. |
| 126 | 3'-n-butyl-5'-sec-butylthioacetophenone. | 3-(3-n-butyl-5-sec-butylthiophenacyl) phthalide. | 2-(3-n-butyl-5-sec-butylthiophenyl)-3,3a-dihydro-8H-pyrazolo[5,1-a]isoindol-8-one. |
| 127 | 3'-methoxy-5'-methylthioacetophenone. | 3-(3-methoxy-5-methylthiophenacyl) phthalide. | 3,3a-dihyro-2-(3-methoxy-5-methylthiophenyl)-8H-pyrazolo[5,1-a]isoindol-8-one. |
| 128 | 5'-n-butylthio-3'-methoxyacetophenone. | 3-(5-n-butylthio-3-methoxyphenacyl) phthalide. | 2-(5-n-butylthio-3-methoxyphenyl)-3,3a-dihydro-8H-pyrazolo[5,1-a]isoindol-8-one. |
| 129 | 2'-n-butoxy-4'-n-butylthioacetophenone. | 3-(2-n-butoxy-4-n-butylthiophenacyl) phthalide. | 2-(2-n-butoxy-4-n-butylthiophenyl)-3,3a-dihydro-8H-pyrazolo[5,1-a]isoindol-8-one. |
| 130 | 2'-fluoro-4'-nitroacetophenone | 3-(2-fluoro-4-nitrophenacyl)phthalide | 2-(2-fluoro-4-nitrophenyl)-3,3a-dihydro-8H-pyrazolo[5,1-a]isoindol-8-one. |
| 131 | 2'-bromo-4'-nitroacetophenone | 3-(2-bromo-4-nitrophenacyl)phthalide | 2-(2-bromo-4-nitrophenyl)-3,3a-dihydro-8H-pyrazolo[5,1-a]isoindol-8-one. |
| 132 | 4'-chloro-2'-nitroacetophenone | 3-(4-chloro-2-nitrophenacyl)phthalide | 2-(4-chloro-2-nitrophenyl)-3,3a-dihydro-8H-pyrazolo[5,1-a]isoindol-8-one. |
| 133 | 4'-methyl-3'-nitroacetophenone | 3-(4-methyl-3-nitrophenacyl)phthalide | 3,3a-dihydro-2-(4-methyl-3-nitrophenyl)-8H-pyrazolo[5,1-a]isoindol-8-one. |
| 134 | 4'-methoxy-2'-nitroacetophenone | 3-(4-methoxy-2-nitrophenacyl)phthalide | 3,3a-dihydro-2-(4-methoxy-2-nitrophenyl)-8H-pyrazolo[5,1-a]isoindol-8-one. |
| 135 | 2'-chloro-4'-methylsulfonylacetophenone. | 3-(2-chloro-4-methylsulfonylphenacyl) phthalide. | 2-(2-chloro-4-methylsulfonylphenyl)-3,3a-dihydro-8H-pyrazolo[5,1-a]isoindol-8-one. |
| 136 | 3'-chloro-5'-trifluoromethylacetophenone. | 3-(3-chloro-5-trifluoromethylphenacyl) phthalide. | 2-(3-chloro-5-trifluoromethylphenyl)-3,3a-dihydro-8H-pyrazolo[5,1-a]isoindol-8-one. |
| 137 | 3'-bromo-5'-trifluoromethylacetophenone. | 3-(3-bromo-5-trifluoromethylphenacyl) phthalide. | 2-(3-bromo-5-trifluoromethylphenyl)-3,3a-dihydro-8H-pyrazolo[5,1-a]isoindol-8-one. |

| Ex. | Ketone | Substituted Phthalide | Substituted Pyrazolo[5,1-a]isoindolones |
|---|---|---|---|
| 138 | 2'-methyl-5'-trifluoromethylacetophenone | 3-(2-methyl-5-trifloromethylphenacyl)phthalide | 2-(2-methyl-5-trifluoromethylphenyl)-3,3a-dihydro-8H-pyrazolo[5,1-a]isoindol-8-one |
| 139 | 2'-methoxy-5-trifluoromethylacetophenone | 3-(2-methoxy-5-trifluoromethylphenacyl)phthalide | 2-(2-methoxy-5-trifluoromethylphenyl)-3,3a-dihydro-8H-pyrazolo[5,1-a]isoindol-8-one |
| 140 | 2'-chloro-4'-cyanoacetophenone | 3-(2-chloro-4-cyanophenacyl)phthalide | 2-(2-chloro-4-cyanophenyl)-3,3a-dihydro-8H-pyrazolo[5,1-a]isoindol-8-one |
| 141 | 2'-bromo-4'-cyanoacetophenone | 3-(2-bromo-4-cyanophenacyl)phthalide | 2-(2-bromo-4-cyanophenyl)-3,3a-dihydro-8H-pyrazolo[5,1-a]isoindol-8-one |
| 142 | 4'-cyano-2'-methylacetophenone | 3-(4-cyano-2-methylphenacyl)phthalide | 2-(4-cyano-2-methylphenyl)-3,3a-dihydro-8H-pyrazolo[5,1-a]isoindol-8-one |
| 143 | Propiophenone | 3-(1-methyl-2-oxo-2-phenylethyl)phthalide | 3,3a-dihydro-3-methyl-2-phenyl-8H-pyrazolo[5,1-a]isoindol-8-one |
| 144 | n-Hexanophenone | 3-(1-n-butyl-2-oxo-2-phenylethyl)phthalide | 3-n-butyl-3,3a-dihydro-2-phenyl-8H-pyrazolo[5,1-a]isoindol-8-one |
| 145 | p-Fluoropropiophenone | 3-(2-p-fluorophenyl-1-methyl-2-oxoethyl)phthalide | 2-(p-fluorophenyl)-3,3a-dihydro-3-methyl-8H-pyrazolo[5,1-a]isoindol-8-one |
| 146 | p-Fluorohexanophenone | 3-(1-butyl-2-p-fluorophenyl-2-oxoethyl)phthalide | 3-butyl-2-(p-fluorophenyl)-3,3a-dihydro-8H-pyrazolo[5,1-a]isoindol-8-one |
| 147 | p-Chloropropiophenone | 3-(2-p-chlorophenyl-1-methyl-2-oxoethyl)phthalide | 2-(p-chlorophenyl)-3,3a-dihydro-3-methyl-8H-pyrazolo[5,1-a]isoindol-8-one |
| 148 | p-Chlorohexanophenone | 3-(1-butyl-2-p-chlorophenyl-2-oxoethyl)phthalide | 3-butyl-2-(p-chlorophenyl)-3,3a-dihydro-8H-pyrazolo[5,1-a]isoindol-8-one |
| 149 | p-Bromopropiophenone | 3-(2-p-bromophenyl-1-methyl-2-oxoethyl)phthalide | 2-(p-bromophenyl)-3,3a-dihydro-3-methyl-8H-pyrazolo[5,1-a]isoindol-8-one |
| 150 | p-Bromohexanophenone | 3-(2-p-bromophenyl-1-butyl-2-oxoethyl)phthalide | 2-(p-bromophenyl)-3-butyl-3,3a-dihydro-8H-pyrazolo[5,1-a]isoindol-8-one |
| 151 | p-Methylpropiophenone | 3-(1-methyl-2-p-methylphenyl-2-oxoethyl)phthalide | 3,3a-dihydro-3-methyl-2-(p-methylphenyl)-8H-pyrazolo[5,1-a]isoindol-8-one |
| 152 | p-Methylhexanophenone | 3-(1-butyl-2-p-methylphenyl-2-oxoethyl)phthalide | 3-butyl-3,3a-dihydro-2-(p-methylphenyl)-8H-pyrazolo[5,1-a]isoindol-8-one |
| 153 | p-Tert-butylpropiophenone | 3-(2-p-tert-butylphenyl-1-methyl-2-oxoethyl)phthalide | 2-(p-tert-butylphenyl)3,3a-dihydro-3-methyl-8H-pyrozolo[5,1-a]isoindol-8-one |
| 154 | p-Tert-butyl-n-hexanophenone | 3-(1-n-butyl-2-p-tert-butylphenyl-2-oxoethyl)phthalide | 3-n-butyl-2-(p-tert-butylphenyl)-3,3a-dihydro-8H-pyrazolo[5,1-a]isoindol-8-one |
| 155 | p-Methoxypropiophenone | 3-(2-p-methoxyphenyl-1-methyl-2-oxoethyl)phthalide | 3,3a-dihydro-2-(p-methoxyphenyl)-3-methyl-8H-pyrazolo[5,1-a]isoindol-8-one |
| 156 | p-Methoxyhexanophenone | 3-(1-butyl-2-p-methoxyphenyl-2-oxoethyl)phthalide | 3-butyl-3,3a-dihydro-2-(p-methoxyphenyl)-8H-pyrazolo[5,1-a]isoindol-8-one |
| 157 | p-Isobutoxypropiophenone | 3-(2-p-isobutoxyphenyl-1-methyl-2-oxoethyl)phthalide | 2-(p-isobutoxyphenyl)-3,3a-dihydro-3-methyl-8H-pyrazolo[5,1-a]isoindol-8-one |

| Ex. | Substituted Phthalaldehydic Acid | Ketone | Substituted Phthalide | Substituted Pyrazolo[5,1-a]isoindolones |
|---|---|---|---|---|
| 158 | 5-flurorphthalaldehydic acid | Acetophenone | 6-fluoro-3-phenacylphthalide | 6-fluoro-3,3a-dihydro-2-phenyl-8H-pyrazolo[5,1-a]isoindol-8-one |
| 159 | 5-chlorophthalaldehydic acid | do | 6-chloro-3-phenacylphthalide | 6-chloro-3,3a-dihydro-2-phenyl-8H-pyrazolo[5,1-a]isondol-8-one |
| 160 | 5-bromophthalaldehydic acid | do | 6-bromo-3-phenacylphthalide | 6-bromo-3,3a-dihydro-2-phenyl-8H-pyrazolo[5,1-a]isoindol-8-one |
| 161 | 5-chlorophthalaldehydic acid | 4'-fluoroacetophenone | 6-chloro-3-(p-fluorophenacyl)phthalide | 6-chloro-2-(p-fluorophenyl)-3,3a-dihydro-8H-pyrazolo[5,1-a]isoindol-8-one |
| 162 | 5-bromophthalaldehydic acid | do | 6-bromo-3-(p-fluorophenacyl)phthalide | 6-bromo-2-(p-fluorophenyl)-3,3a-dihydro-8H-pyrazolo[5,1-a]isoindol-8-one |
| 163 | 5-chlorophthalaldehydic acid | 4'-chloroacetophenone | 3-(p-chlorophenacyl)-6-chlorophthalide | 6-chloro-2-(p-chlorophenyl)-3,3a-dihydro-8H-pyrazolo[5,1-a]isoindol-8-one |
| 164 | 5-bromophthalaldehydic acid | do | 6-bromo-3-(p-chlorophenacyl)phthalide | 6-bromo-2-(p-chlorophenyl)-3,3a-dihydro-8H-pyrazolo[5,1-a]isoindol-8-one |
| 165 | 5-chlorophthalaldehydic acid | 4'-bromoacetophonone | 3-(p-bromophenacyl)-6-chlorophthalide | 2-(p-bromophenyl)-6-chloro-3,3a-dihydro-8H-pyrazolo[5,1-a]isoindol-8-one |
| 166 | 5-bromophthalaldehydic acid | do | 3-(p-bromophenacyl)-6-bromophthalide | 6-bromo-2-(p-bromophenyl)-3,3a-dihydro-8H-pyrazolo[5,1-a]isonidol-8-one |
| 167 | 5-chlorophthalaldehydic acid | 4'-methylacetophenone | 6-chloro-3-(p-methylphenacyl)phthalide | 6-chloro-3,3a-dihydro-2-(p-methylphenyl)-8H-pyrazolo[5,1-a]isoindol-8-one |
| 168 | 5-bromophthalaldehydic acid | do | 6-bromo-3-(p-methylphenacyl)phthalide | 6-bromo-3,3a-dihydro-2-(p-methylphenyl)-8H-pyrazolo[5,1-a]isoindol-8-one |
| 169 | 5-chlorophthalaldehydic acid | 4'-tert-butylacetophenone | 3-(p-tert-butylphenacyl)-6-chlorophthalide | 2-(p-tert-butylphenyl)-6-chloro-3,3a-dihydro-8H-pyrazolo[5,1-a]isoindol-8-one |
| 170 | 5-bromophthalaldehydic acid | do | 6-bromo-3-(p-tert-butylphenacyl)phthalide | 6-bromo-2-(p-tert-butylphenyl)-3,3a-dihydro-8H-pyrazolo[5,1-a]isoindol-8-one |
| 171 | 5-chlorophthalaldehydic acid | 4'-methoxyacetophenone | 6-chloro-3-(p-methoxyphenacyl)phthalide | 6-chloro-3,3a-dihydro-2-(p-methoxyphenyl)-8H-pyrazolo[5,1-a]isoindol-8-one |
| 172 | 5-bromophthalaldehydic acid | do | 6-bromo-3-(p-methoxyphenacyl)phthalide | 6-bromo-3,3a-dihydro-2-(p-methoxyphenyl)-8H-pyrazolo[5,1-a]isoindol-8-one |
| 173 | 5-chlorophthalaldehydic acid | 4'-n-butoxyacetophenone | 3-(p-n-butoxyphenacyl)-6-chlorophthalide | 2-(p-n-butoxyphenyl)-6-chloro-3,3a-dihydro-8H-pyrazolo[5,1-a]isoindol-8-one |
| 174 | 5-bromophthalaldehydic acid | do | 6-bromo-3-(p-n-butoxyphenacyl)phthalide | 6-bromo-2-(p-n-butoxyphenyl)-3,3a-dihydro-8H-pyrazolo[5,1-a]isoindol-8-one |
| 175 | 4,5-dichlorophthalaldehydic acid | Acetophenone | 5,6-dichloro-3-phenacylphthalide | 5,6-dichloro-3,3a-dihydro-2-phenyl-8H-pyrazolo[5,1-a]isoindol-8-one |
| 176 | 4,5-dibromophthalaldehydic acid | 4'-methoxyacetophenone | 5,6-dibromo-3-(p-methoxyphenacyl)phthalide | 5,6-dibromo-3,3a-dihydro-2-(p-methoxyphenyl)-8H-pyrazolo[5,1-a]isoindol-8-one |
| 177 | 3,4,5,6-tetrachlorophthalaldehydic acid | Acetophenone | 4,5,6,7-tetrachloro-3-phenacylphthalide | 3,3a-dihydro-2-phenyl-4,5,6,7-tetrachloro-8H-pyrazolo[5,1-a]isoindol-8-one |
| 178 | 3,4,5,6-tetrabromophthalaldehydic acid | 4'-methylacetophenone | 4,5,6,7-tetrabromo-3-(p-methylphenacyl)phthalide | 3,3a-dihydro-2-(p-methylphenyl)-4,5,6,7-tetrabromo-8H-pyrazolo[5,1-a]isoindol-8-one |
| 179 | 3,4,5,6-tetrachlorophthalaldehydic acid | 4'-methoxyacetophenone | 4,5,6,7-tetrachloro-3-(p-methoxyphenacyl)phthalide | 3,3a-dihydro-2-(p-methoxyphenyl)-4,5,6,7-tetrachloro-8H-pyrazolo[5,1-a]isoindol-8-one |

EXAMPLE 180

Three-fourths to one and one-half pounds of 3,3a-dihydro-2 - (p-methoxyphenyl) - 8H - pyrazolo[5,1-a]isoindol-8-one as a wettable powder are combined with three pounds of sodium 2,2-dichloropropionate in sixty gallons of water. This combination is applied as a directed spray at ground level in a field of sugar cane which is at least 18 inches tall. Weeds such as chickweed, *Stellaria media*; lambsquarters, *Chenopodium album*; pigweed, *Amaranthus retroflexus*; barnyard grass, *Echinochloa crusgalli*; and alexander grass, Brachiaria spp. are just emerging. The formulation controls the weeds and causes no injury to the sugar cane if applied in the above manner.

EXAMPLE 181.—Preparation of 2-(p-fluorophenyl)-3, 3a-dihydro-8H-pyrazolo[5,1-a]isoindol-8-one To 600 parts of 2B alcohol containing 41 parts by weight of 4'-fluoroacetophenone and 45 parts of phthalaldehydic acid is added gradually 24 parts of potassium hydroxide in 30 parts of water. The mixture is stirred for about a period of 6 hours. The solution is diluted with water and acidified with concentrated hydrochloric acid to give 55 parts of essentially pure 3-(p-fluorophenacyl)-phthalide.

A mixture of 22 parts by weight of 3-(p-fluorophenacyl)-phthalide and 17 parts of hydrazine hydrochloride in 500 parts of 2B alcohol and 100 parts of water is heated to near reflux. After a few minutes, 32 parts of triethylamine is added gradually and the mixture is heated at reflux for a period of 3 hours. The cooled solution is acidified with concentrated hydrochloric acid, and then reheated at reflux for ½ hour. The solution is cooled, reduced in volume and diluted with about 600 parts of water to give 116 parts of essentially pure 2-(p-fluorophenyl) - 3,3a - dihydro - 8H-pyrazolo[5,1-a]isoindol-8-one.

The pure compound is formulated as follows:

| | Percent |
|---|---|
| 3,3-dihydro-2-(p-fluorophenyl)-8H-pyrazolo[5,1-a]isoindol-8-one | 80.0 |
| Dioctyl sodium sulfosuccinate | 1.0 |
| Low viscosity methyl cellulose | 0.3 |
| Attapulgite clay | 18.7 |

The above components are blended and micropulverized as in Example 1.

One-half pound of this formulation is suspended in 60 gallons of water. This suspension is applied to greenhouse chrysanthemums by spraying the foliage to the point of run-off. This application is made in the late summer while the plants are still in the vegetative state.

This treatment prevents the floral induction of plants for approximately three months during the short days of fall and winter, eliminating the need for supplemental light to keep the plants vegetative until flowers are desired. By varying the dosage rate of the treatment, one is able to have chrysanthemums plants in flower at any time during the winter or spring without the use of supplemental lighting.

EXAMPLE 182

| | Percent |
|---|---|
| 3,3a-dihydro-2-phenyl-8H-pyrazolo[5,1-a]isoindol-8-one | 25.0 |
| Sodium lauryl sulfate | 0.5 |
| Ca, Mg lignin sulfonate | 1.0 |
| Kaolin clay | 73.5 |

The above components are blended and ground in the manner of the formulation of Example 1.

A suspension of 2 to 4 pounds of active ingredient of this formulation in 60 gallons of water is prepared. This suspension is sprayed uniformly over an acre of bluegrass turf.

The treatment retards the growth of the grass over an extended period, reducing the mowing necessary to maintain the area. The treatment promotes axillary bud development on the treated plants making the turf thicker. At the same time, good control of buckhorn plantain, wild carrot, and aster is noted.

An application of 1/100 pound of active ingredient in 60 gallons of water gives a 90% reduction in flowering and fruit production on Black Valentine bean. The bean plants exhibit an 80% growth reduction.

EXAMPLE 183

| | Percent |
|---|---|
| 3,3a-dihydro-2-phenyl-8H-pyrazolo[5,1-a]-isoindol-8-one | 25.0 |
| Alkylnaphthalene sulfonic acid, Na salt | 1.0 |
| Anhydrous sodium sulfate | 15.0 |
| Non-swelling Ca, Mg bentonite | 30.0 |
| Kaolin clay | 29.0 |

The above components are blended and micropulverized, then mixed with 15–20% water in a pug mill and extruded as ⅛″ cylinders. These cylinders are cut into ⅛″ lengths as they extrude to form pellets which are then dried.

These pellets are used as a soil application to retard the growth of bush species.

EXAMPLE 184

| | Percent |
|---|---|
| 3,3a-dihydro-2-(p-methoxyphenyl)-8H-pyrazolo-[5,1-a]isoindol-8-one | 35.0 |
| Ca, Mg lignin sulfonate | 15.0 |
| Hydrated attapulgite | 1.5 |
| Sodium pentachlorophenate | 0.7 |
| Sodium hydroxide | 0.6 |
| Water | 47.2 |

The active component is first micropulverized then combined with the other components and the slurry ground in a sand mill until substantially all particles are smaller then 5 microns.

This formulation is mixed with water at the rate of five pounds of active ingredient per 100 gallons of water and four pounds of polyoxyethylene sorbitan monolaurate are added. This suspension is sprayed to run-off on roadside vegetation containing a mixture of grasses and herbaceous annuals and perennials.

The treatment retards the growth of vegetation along the roadside and reduces the number of mowings necessary to maintain a neat road right-of-way. The treatment also prevents the flowering and seed set on many of the plants present, thereby reducing the seed present to propagate undesirable annual weedy grasses and broadleaves.

EXAMPLE 185

| | Percent |
|---|---|
| 3,3a - dihydro - 2 - (p-chlorophenyl)-8H-pyrazolo-[5,1-a]isoindol-8-one | 5.00 |
| Fine silica | 1.25 |
| Granular vermiculite | 88.75 |
| Trimethylnonyl polyethylene glycol ether | 5.00 |

The active component and fine silica are first blended and micropulverized, then blended gently with the granular vermiculite. The surfactant is mixed with an equal weight of water and sprayed upon the mixture previously prepared. The water is permitted to evaporate to give the final product.

A spreader is used to apply this granular product to a lawn at the rate of 2 pounds of formulation per 1000 square feet. The application is made when the grass is wet from dew or the area to be treated is wet with a lawn sprinkler just prior to treatment.

The treatment retards the growth of a bluegrass lawn, greatly reducing the number of mowings necessary to maintain it in an attractive condition. The chemical treatment also promotes axillary growth on the treated lawn, making the turf thicker.

EXAMPLE 186

One half to one pound of 3,3a-dihydro-2-(p-methoxyphenyl)-8H-pyrazolo[5,1-a]isoindol-8-one and two to four pounds of maleic hydrazide are dispersed in 100 gallons of water. This mixture is applied to run-off as a foliar spray to trimmed trees with about four inches of regrowth, along a power line right-of-way.

This treatment curtails the growth of the trimmed trees. The trees require less frequent trimming to keep them below the transmission lines.

EXAMPLE 187

One pound of 3,3a-dihydro-2-(p-chlorophenyl)-8H-pyrazolo[5,1-a]isoindol-8-one and eight pounds of 2,3,5,6-tetrachloroterphthalic acid, dimethyl ester are suspended in 50 gallons of water. This mixture is sprayed in early spring on an acre of mixed turf grasses and broadleaved weeds in a lawn around a manufacturing plant.

The treatment effectively removes broadleaf weeds such as buckhorn plantain, *Plantago lanceolata*; daisy fleabane, *Erigeron* spp. and broadleaf plantain, *Plantago major* from the turf and controls crabgrass, Digitaria spp. The treated turf has a much more pleasing appearance than surrounding untreated areas. At the same time the treatment significantly reduces the number of required mowings during the season.

EXAMPLE 188

Three-fourths to three pounds of 3,3a-dihydro-2-(3,4,5-trimethoxyphenyl) - 8H - pyrazolo[5,1 - a]isoindol-8-one, formulated as a wettable powder, is suspended in 40 gallons of water. This suspension is applied to an acre of rice as a pre-emergence or early post-emergence spray.

This treatment effectively controls barnyard grass, *Echinochloa crusgalli*, up to three inches tall at the time of treatment. It also controls this weed when applied pre-emergence.

EXAMPLE 189

Two and eight-tenths pounds of the formulation of Example 184 is suspended in a sufficient amount of water to provide a total volume of six gallons. A non-phytotoxic wetting agent such as polyoxyethylene sorbitan monolaurate (0.15 pounds) is added. The resulting suspension is sprayed over an acre of sugarcane about six weeks before harvest.

The treated plants do not flower before harvest while sugarcane in an adjacent field develop flowers.

EXAMPLE 190

|  | Percent |
|---|---|
| 3,3a - dihydro - 2-(p-methoxyphenyl)-8H-pyrazolo-[5,1-a]isoindol-8-one | 80.0 |
| Alkylnaphthalene sulfonic acid, Na salt | 1.5 |
| Partially desulfonated sodium lignin sulfonate | 2.0 |
| Synthetic fine silica | 16.5 |

The above components are mixed in a ribbon blendor, micropulverized until substantially all particles are below fifty microns and reblended to yield a readily dispersible wettable powder for application as an aqueous spray.

Two pounds of such formulation are suspended in 100 gallons of water and two pounds of a non-phytotoxic wetting agent such as polyoxyethylene sorbitan monolaurate is added. The resulting suspension is sprayed over the top of an acre of sugarcane about forty days prior to harvest.

The treated plants do not flower before harvest while sugarcane in an adjacent field develops flowers.

EXAMPLE 191

Three ounces of the formulation of Example 191 is suspended in 104 gallons of water and one pound of a nonphytotoxic wetting agent such as polyoxyethylene sorbitan monolaurate is added. The resulting suspension is sprayed over an acre of syrup type sorghum about eight weeks old. The plants are 36 to 42 inches tall at this time but seed head development is not apparent.

The treatment prevents flowering and subsequent grain development. After the sorghum is harvested and compared with an acre of untreated sorghum it is noticed that a significantly greater yield of syrup is obtained from the treated sorghum.

The invention claimed is:

1. A plant growth retarding composition comprising a major amount of an inert diluent and a plant growth retarding amount of a compound of the formula:

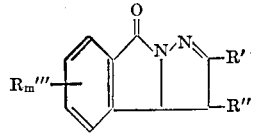

wherein

R' is selected from the group consisting of tert-alkyl of 4 through 12 carbon atoms,

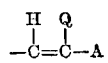

naphthyl, phenanthryl, phthalidylalkyl where the alkyl is 1 through 3 carbon atoms and

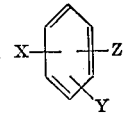

$m$ is 1 when R''' is fluorine and is a whole number less than 5 when R''' is selected from the group consisting of chlorine and bromine;

A is selected from the group consisting of hydrogen, methyl, phenyl, methylphenyl, and chlorophenyl;

Q is selected from the group consisting of hydrogen and methyl;

X is selected from the group consisting of hydrogen, halogen, alkyl of 1 through 4 carbon atoms, alkoxy of 1 through 4 carbon atoms, alkylthio of 1 through 4 carbon atoms, nitro, methylsulfonyl, trifluoromethyl and cyano;

Y and Z are each separately selected from the group consisting of hydrogen, halogen, alkyl containing 1 through 4 carbon atoms, and alkoxy containing 1 through 4 carbon atoms;

R'' is selected from the group consisting of hydrogen, alkyl of 1 through 4 carbon atoms and cyano; and R''' is selected from the group consisting of hydrogen, fluorine, chlorine and bromine.

2. Method for retarding the growth of plants comprising applying to the locus of growth of a plant, a growth retarding amount of a compound of the formula:

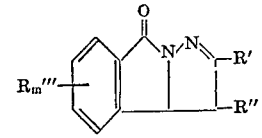

wherein

R' is selected from the group consisting of tert-alkyl of 4 through 12 carbon atoms,

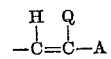

naphthyl, phenanthryl, phthalidylalkyl where the alkyl is 1 through 3 carbon atoms and

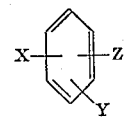

$m$ is 1 when R''' is fluorine and is a whole number less than 5 when R''' is selected from the group consisting of chlorine and bromine;

A is selected from the group consisting of hydrogen, methyl, phenyl, methylphenyl, and chlorophenyl;

Q is selected from the group consisting of hydrogen and methyl;

X is selected from the group consisting of hydrogen, halogen, alkyl of 1 through 4 carbon atoms, alkoxy of 1 through 4 carbon atoms, alkylthio of 1 through 4 carbon atoms, nitro, methylsulfonyl, trifluoromethyl and cyano;

Y and Z are each separately selected from the group consisting of hydrogen, halogen, alkyl containing 1 through 4 carbon atoms, and alkoxy containing 1 through 4 carbon atoms;

R'' is selected from the group consisting of hydrogen, alkyl of 1 through 4 carbon atoms and cyano; and R''' is selected from the group consisting of hydrogen, fluorine, chlorine and bromine.

3. Method according to claim 2 wherein the compound applied is 3,3a-dihydro-2-(p-methoxyphenyl)-8H-pyrazolo[5,1-a] isoindol-8-one.

4. Method according to claim 2 wherein the compound applied is 3,3a-dihydro-2-(p-chlorophenyl)-8H-pyrazolo[5,1-a]isoindol-8-one.

5. Method according to claim 2 wherein the compound applied is 3,3a-dihydro-2-phenyl-8H-pyrazolo[5,1-a]isoindol-8-one.

6. Method of controlling the growth of plants comprising applying to a locus to be protected a herbicidal amount of a compound of the formula:

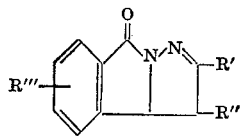

wherein

R' is selected from the group consisting of tert-alkyl of 4 through 12 carbon atoms,

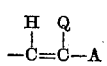

naphthyl, phenanthryl, phthalidylalkyl where the alkyl is 1 through 3 carbon atoms and

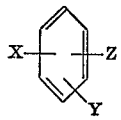

m is 1 when R''' is fluorine and is a whole number less than 5 when R''' is selected from the group consisting of chlorine and bromine;

A is selected from the group consisting of hydrogen, methyl, phenyl, methylphenyl, and chlorophenyl;

Q is selected from the group consisting of hydrogen and methyl;

X is selected from the group consisting of hydrogen, halogen, alkyl of 1 through 4 carbon atoms, alkoxy of 1 through 4 carbon atoms, alkylthio of 1 through 4 carbon atoms, nitro, methylsulfonyl, trifluoromethyl and cyano;

Y and Z are each separately selected from the group consisting of hydrogen, halogen, alkyl containing 1 through 4 carbon atoms, and alkoxy containing 1 through 4 carbon atoms;

R'' is selected from the group consisting of hydrogen, alkyl of 1 through 4 carbon atoms and cyano; and R''' is selected from the group consisting of hydrogen, fluorine, chlorine and bromine.

References Cited

UNITED STATES PATENTS 2,305,593  12/1942  Avery _____ 71—2.5
2,392,518  1/1946  Barnhill _____ 71—2.5

OTHER REFERENCES

Rowe et al. Ca. vol. 41 (1947) pp. 5533, 5544.

LEWIS GOTTS, *Primary Examiner.*

G. HOLLRAH, *Assistant Examiner.*